United States Patent
Olbert et al.

(10) Patent No.: US 9,725,320 B2
(45) Date of Patent: Aug. 8, 2017

(54) BASKET-LIKE DEVICE HAVING WALL INSULATION

(71) Applicant: BASF SE, Ludwigshafen (DE)

(72) Inventors: Gerhard Olbert, Dossenheim (DE); Holger Friedrich, Worms (DE); Andreas Wölfert, Bad Rappenau (DE); Robert Kuhn, Haßloch (DE); Tobias Lenke, Lambsheim (DE); Wolfgang Gmeiner, Dannstadt-Schauernheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/911,952

(22) PCT Filed: Aug. 6, 2014

(86) PCT No.: PCT/EP2014/066880
§ 371 (c)(1),
(2) Date: Feb. 12, 2016

(87) PCT Pub. No.: WO2015/022247
PCT Pub. Date: Feb. 19, 2015

(65) Prior Publication Data
US 2016/0200575 A1    Jul. 14, 2016

(30) Foreign Application Priority Data

Aug. 16, 2013   (EP) .................................... 13180626

(51) Int. Cl.
*C01B 21/20*   (2006.01)
*C01B 21/26*   (2006.01)
(Continued)

(52) U.S. Cl.
CPC ............... *C01B 21/38* (2013.01); *B01J 8/008* (2013.01); *B01J 8/025* (2013.01); *B01J 8/0285* (2013.01);
(Continued)

(58) Field of Classification Search
CPC .. B01J 8/008; B01J 8/025; B01J 2208/00495; B01J 2208/00884; B01J 8/0285;
(Continued)

(56) References Cited

U.S. PATENT DOCUMENTS 3,195,988 A * 7/1965 Roberts .................. B01J 8/0278
                                                        422/219
3,428,424 A * 2/1969 Keith ...................... C01B 21/26
                                                        423/392
(Continued)

FOREIGN PATENT DOCUMENTS

DE    102007026712 A1   12/2008
EP        0355690 A2     2/1990
(Continued)

OTHER PUBLICATIONS

International Search Report for PCT/EP2014/066880 mailed Oct. 27, 2014.

*Primary Examiner* — Timothy Vanoy
(74) *Attorney, Agent, or Firm* — Drinker Biddle & Reath LLP

(57) ABSTRACT

A device D accommodated in a reactor R and containing a gas- and/or liquid-permeable bottom B, in the peripheral region of which is arranged a lateral boundary W which completely surrounds the bottom B and forms a volume V which is partially or completely filled with catalytic and/or non-catalytic moldings, there optionally being located on the side facing the bottom B in the upstream direction at least one noble metal and/or non-noble metal fabric, wherein a thermal insulation layer S is located on at least part of the surface of the inner side of the lateral boundary W of the
(Continued)

device D, the material for the thermal insulation layer S being selected from the group consisting of ceramic material, microporous material and silicate fibers.

15 Claims, 16 Drawing Sheets

(51) Int. Cl.
 *C01B 21/28* (2006.01)
 *C01B 21/38* (2006.01)
 *B01J 8/02* (2006.01)
 *B01J 8/00* (2006.01)

(52) U.S. Cl.
 CPC ............ *C01B 21/20* (2013.01); *C01B 21/265* (2013.01); *C01B 21/28* (2013.01); *B01J 2208/00495* (2013.01); *B01J 2208/00814* (2013.01); *B01J 2208/00884* (2013.01)

(58) Field of Classification Search
 CPC ............ B01J 2208/00814; C01B 21/28; C01B 21/20; C01B 21/265; C01B 21/38
 See application file for complete search history.

(56) References Cited

U.S. PATENT DOCUMENTS

| | | | | |
|---|---|---|---|---|
| 3,462,243 A | * | 8/1969 | Riga | ............... C01B 21/28 422/211 |
| 3,597,166 A | * | 8/1971 | Hochman | ............... B01J 4/001 138/39 |
| 3,627,497 A | * | 12/1971 | Klein | ............... C01B 21/28 422/211 |
| 9,056,307 B2 | * | 6/2015 | Keller | ............... B01J 23/42 |
| 9,108,175 B2 | * | 8/2015 | Schwefer | ............... B01J 8/008 |
| 9,242,216 B2 | | 1/2016 | Fuchs | |
| 2015/0209754 A1 | * | 7/2015 | Fuchs | ............... C01B 21/28 422/198 |

FOREIGN PATENT DOCUMENTS

| | | |
|---|---|---|
| EP | 1419812 A1 | 5/2004 |
| WO | WO-03/011448 A1 | 2/2003 |
| WO | WO-2004/005187 A1 | 1/2004 |
| WO | WO-2013034303 A1 | 3/2013 |

* cited by examiner

BASKET-LIKE DEVICE HAVING WALL INSULATION

CROSS-REFERENCE TO RELATED APPLICATIONS

This application is a national stage application (under 35 U.S.C. §371) of PCT/EP2014/066880, filed Aug. 6, 2014, which claims benefit of European Application No. 13180626.7, filed Aug. 16, 2013, both applications of which are incorporated herein by reference in their entirety.

The present invention relates to a device D accommodated in a reactor R, preferably a high-temperature reactor, to a reactor R containing the device D, to the use of the device D, to the use of the reactor R containing the device D and to a method for producing nitrogen oxides or nitric acid using the device D, in each case as defined in the claims.

BACKGROUND OF THE INVENTION

Devices, for example of basket-like shape, which are accommodated in reactors and generally, also for reasons of design or strength, consist of materials with good thermal conductivity such as metal or metal alloys, for example steel, expand when the reactor is for example heated to operating temperature or heats up due to the heat of reaction and contract when the reactor cools.

If such devices contain readily displaceable, particulate, for example bulk packings of cylindrical or stellate catalyst particles, the differences in thermal expansion between the device and said packing result in the formation of indentations, often irregular and funnel-shaped, into which the particles trickle or subside, conventionally from the peripheral region of device.

This is unwanted since non-uniformity of the packing conventionally results in impaired characteristics, for example with regard to the catalytic behavior thereof. This is because, for example, the flow velocity of a gas is higher in the indentations in the peripheral region than in regions without any indentation, so the residence time of the gas in the peripheral region conventionally falls and moreover a smaller catalytic area is available to the reaction gas there, so resulting in lower levels of catalytic conversion in the peripheral region and overall.

The above-described disadvantages are encountered for example in methods for producing nitrogen oxides and/or nitric acid by oxidizing ammonia in the presence of a catalyst, for example a catalyst gauze containing noble metal. The oxidation products of ammonia are here conventionally passed through a bed of a particulate nitrous oxide decomposition catalyst which is conventionally located in a basket-like device. In said method, the above-stated funnel-shaped indentations in this bed of nitrous oxide decomposition catalyst for example result in reduced decomposition of the laughing gas in the peripheral region of the catalyst bed, which in turn conventionally results in higher nitrous oxide emissions from the production plant which are not desired.

WO 2004/005187 A1 (Yara International) describes a "burner basket" with metal walls and a perforated bottom plate which is located in an ammonia oxidation burner. The metal walls have a specific geometry in order to suppress non-uniformity of the catalyst bed. WO 2004/005187 A1 does not disclose a thermal insulation layer.

WO 03/011448 A1 (Johnson Matthey Plc) describes a fluid-permeable fixed bed on a perforated bottom which is surrounded by a wall. The wall has a specific geometry in order to suppress non-uniformity of the catalyst bed. WO 03/011448 A1 does not disclose a thermal insulation layer.

DETAILED DESCRIPTION OF THE INVENTION

Figure 1:
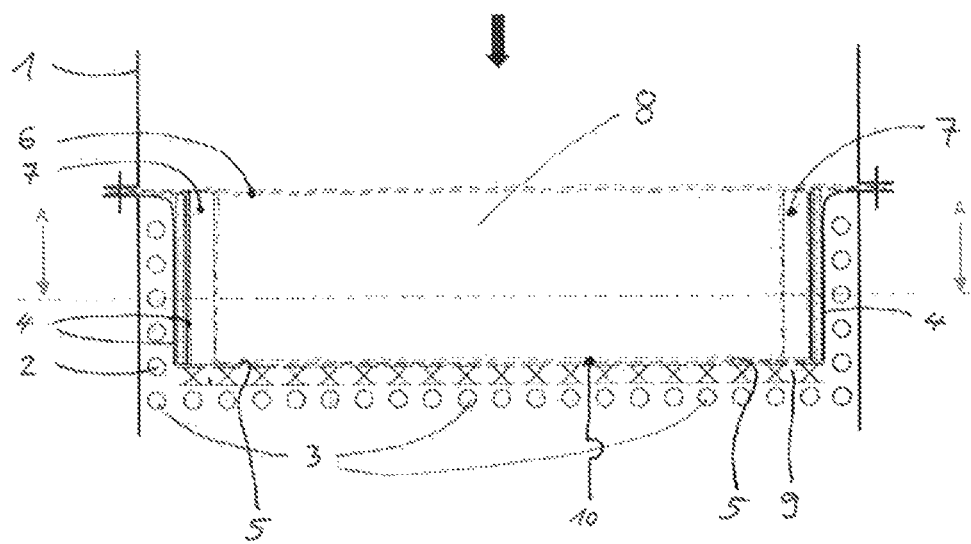
FIG. 1 represents a longitudinal cross-section through part of a cylindrical reactor.

The object of the present invention was to provide a device which does not greatly expand, in particular in the peripheral regions, and thus maintains the uniformity of a bed of particles accommodated therein, the initial bed height remaining as far as possible unchanged virtually over the entire cross-sectional area of the device and indentations in the peripheral region of the device being avoided or reduced.

The device D which is accommodated in a reactor R, preferably a high-temperature reactor, a reactor R containing the device D, the use of the device D, the use of the reactor R containing the device D and a method for producing nitrogen oxides or nitric acid using the device D, in each case as defined in the claims, are accordingly provided.

In a preferred embodiment of the invention, the device D and reactor R, in each case as described hereinafter, are used in a method for producing nitrogen oxides and/or nitric acid. This embodiment is hereinafter also designated the "NOx/HNO₃ embodiment" and, unless explicitly stated otherwise, the following in particular expressly applies to the NOx/HNO₃ embodiment.

Methods for producing nitrogen oxides and/or nitric acid, conventionally by catalytic oxidation of ammonia with an oxygen-containing gas, generally air, are known and described for example under "Nitric Acid, Nitrous Acid, and Nitrogen Oxides" in Ullmann's Encyclopedia of Industrial Chemistry, Sixth, Completely Revised Edition, volume 23, pages 1 to 49, 2003, Wiley-VCH Verlag GmbH & Co. KGaA, Weinheim.

In a method for producing nitrogen oxides and/or nitric acid, a mixture of ammonia and an oxygen-containing gas, for example air or also pure oxygen, is conventionally catalytically reacted, conventionally at relatively elevated temperatures, for example in the range from 800 to 900° C., for example on a gauze of noble metal such as platinum or platinum-rhodium alloy, and the resultant reaction products, which generally contain nitrogen monoxide as major component and dinitrogen oxide ("nitrous oxide") as minor component, conventionally flow through a bed with catalytic and/or non-catalytic, conventionally ceramic, moldings which are resistant to the reaction conditions in the reactor, which bed is arranged downstream in the direction of flow, conventionally beneath, the catalyst gauze.

Said bed is conventionally catalytically active with regard to the decomposition of dinitrogen oxide, is conventionally accommodated in a basket-like device and generally breaks the dinitrogen monoxide down into the elements nitrogen ($N_2$) and oxygen ($O_2$). Once the reaction mixture has left the conventionally basket-like device, it is conventionally cooled in heat exchangers, it reacting further with oxygen to form nitrogen dioxide. The reaction mixture is generally cooled further by means of various heat exchangers, some nitric acid possibly already condensing out, and the reaction mixture is finally reacted with water in an absorption device to form nitric acid. Any dilute nitric acid which may have previously condensed out during cooling/condensation is conventionally likewise fed into the absorption device.

The invention is described in greater detail below.

The material for the device D is conventionally a high-temperature metallic material, for example Inconel 600 (material no. 2.4816), alloy 602 CA, Haynes alloy or also austenitic steel materials with the material designations 1.4828 and 1.4835.

One highly suitable material for the device D is Inconel 600 or steel with the material number 1.4835 or alloy 602 CA or Haynes alloy.

Preferred materials for device D are Inconel 600, steel with the material number 1.4835 or alloy 602 CA.

The bottom B of the device D is generally perforated, the nature and geometry of the perforations being non-critical, and is in particular permeable to gases and/or liquids, preferably to gases. The bottom B is conventionally perforated such that the particles which it conventionally supports cannot drop through the perforations.

Figure 3:
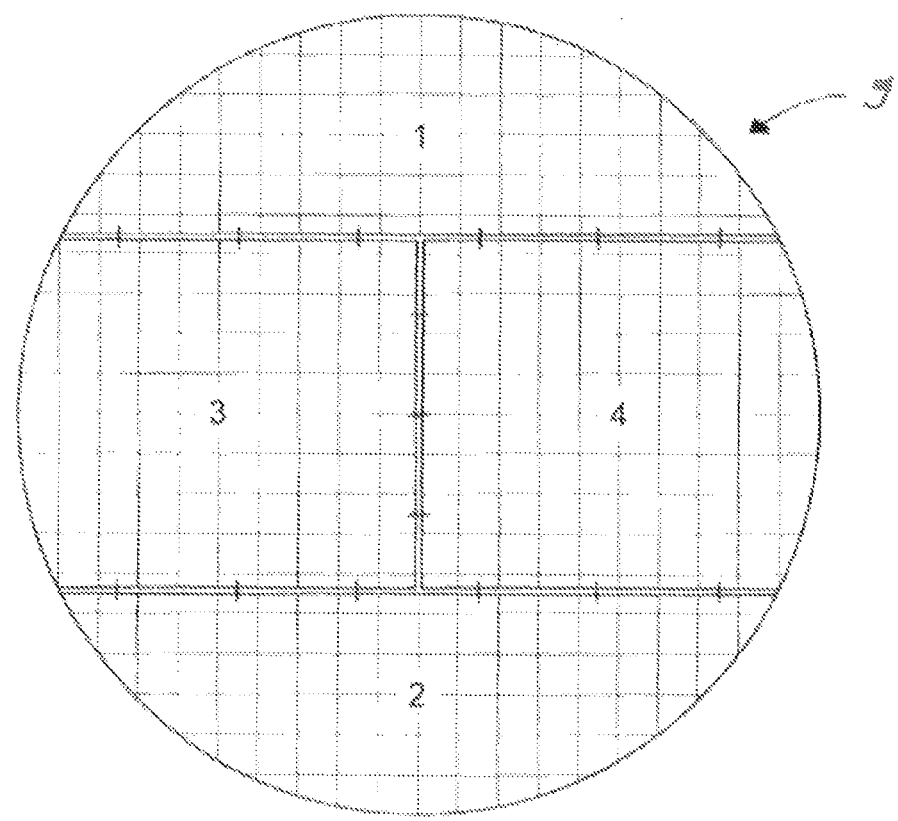
FIG. 3 represents a supporting part in the form of a grate.

In one embodiment, the bottom B contains a supporting part, for example a grate comprising a frame and a honeycomb structure on which generally rests a metallic bottom screen or rest a plurality, for example two to three, metallic bottom screens, conventionally of different mesh sizes and/or different mesh wire thicknesses. The supporting part, for example a grate comprising a frame and a honeycomb structure, may consist of one piece, but it may also be assembled from a plurality of segments, preferably 2 to 8 segments, particularly preferably 4 to 6 segments, the geometry of the segments possibly being diverse, for example quarter circle segments, sixth circle segments, eighth circle segments, i.e. "cake slice geometry", but may for example also be segmented as shown in FIG. 3.

The stated bottom screen or stated bottom screens may be formed from one piece and/or from a plurality of sub-pieces and be arranged side by side and/or one on top of the other, preferably overlapping, preferably on a supporting part, for example a grate comprising a frame and a honeycomb structure, the undermost screen conventionally being a screen of a greater wire thickness and larger mesh size. In the peripheral region of the bottom B, the sides of the stated bottom screen or the stated bottom screens are conventionally drawn up, such that they partially or preferably completely cover for example the lateral boundary W and/or the thermal insulation layer S.

The openings of the above-stated bottom screens may be of any cross-sectional geometry, for example rectangular, hexagonal or round.

The bottom B is conventionally made from material 1.4835, alloy 602 CA and Inconel 600, preferably Inconel 600 or alloy 602 CA.

The cross-sectional geometry of the bottom B per se is generally determined by the cross-sectional geometry of the reactor R in which it is conventionally accommodated. The cross-sectional geometry of the bottom B is preferably the same such as that of the reactor R in which the bottom B is accommodated.

Cross-sectional geometries for the bottom B and/or the reactor R in which it is accommodated which may be considered are polygonal, preferably quadrangular or hexagonal, particularly preferably rectangular or uniformly hexagonal cross-sections.

Cross-sectional geometries for the bottom B and/or the reactor R in which it is accommodated which may furthermore be considered are virtually round or elliptical cross-sections, preferably virtually round or round cross-sections for the bottom B and/or the reactor R in which it is accommodated. The cross-section of the bottom B and/or the cross-section of the reactor in which it is accommodated is particularly preferably virtually round or round.

The bottom B may be mounted for example directly or via a spacing system on a cooler or heat exchanger arranged in the reactor R downstream of the bottom B. The bottom B may also be attached in the reactor R to a separate supporting system, for example comprising a central support and lateral lugs, the latter conventionally attached to the internal wall of the reactor in the circumferential direction.

The material for the lateral boundary W of the device D is conventionally the same as for the bottom B.

The lateral boundary W is arranged in the peripheral region of the bottom B in such a manner that it completely surrounds the bottom B and forms a space with the volume V which is partially or completely filled with catalytic and/or non-catalytic moldings. These catalytic and/or non-catalytic moldings may be solid particles, generally with a length in the range from 3 to 30 mm, a diameter in the range from 2 to 10 mm, for example with a cylindrical or stellate cross-section, and/or larger moldings, for example in the form of hexagonal honeycombs. Further catalytic and/or non-catalytic moldings may be the following: high flow rings, rings, spheres, extrudates, hollow extrudates or further solid particles and/or moldings.

The lateral boundary W is conventionally arranged relative to the bottom B at the angles of 45° to 135°, preferably virtually at right angles. The lateral boundary W is conventionally straight, i.e. virtually uncurved in the vertical direction.

FIGS. 1, 2, 4, 5, 6, 7, 8 and 9 show by way of example shapes of the lateral boundary W, together with the thermal insulation layer S, in which the reference signs have the meaning stated herein.

The ratio of the height of the lateral boundary W to the internal diameter of the bottom B is conventionally in the range from 0.04 to 0.2.

Conventional heights of the lateral boundary W are in the range from 100 to 1000 mm, preferably 150 to 600 mm.

Conventional internal diameters of the bottom B are in the range from 2500 to 6000 mm.

The lateral boundary W may, but need not, be produced from a single piece and may instead also consist of individual parts or segments.

On at least part of the surface of the inner side of the lateral boundary W there is a thermal insulation layer S, preferably in the adjoining region immediately upstream from the bottom B. The thermal insulation layer S may cover for example 30% to virtually 100% of the surface of the inner side of the lateral boundary W, preferably virtually the entire area.

The thermal insulation layer S preferably covers at least the lower 30%, for example 30% to 90%, thus those parts of the surface of the inner side of the lateral boundary W which are closest to the bottom B.

Figure 2:
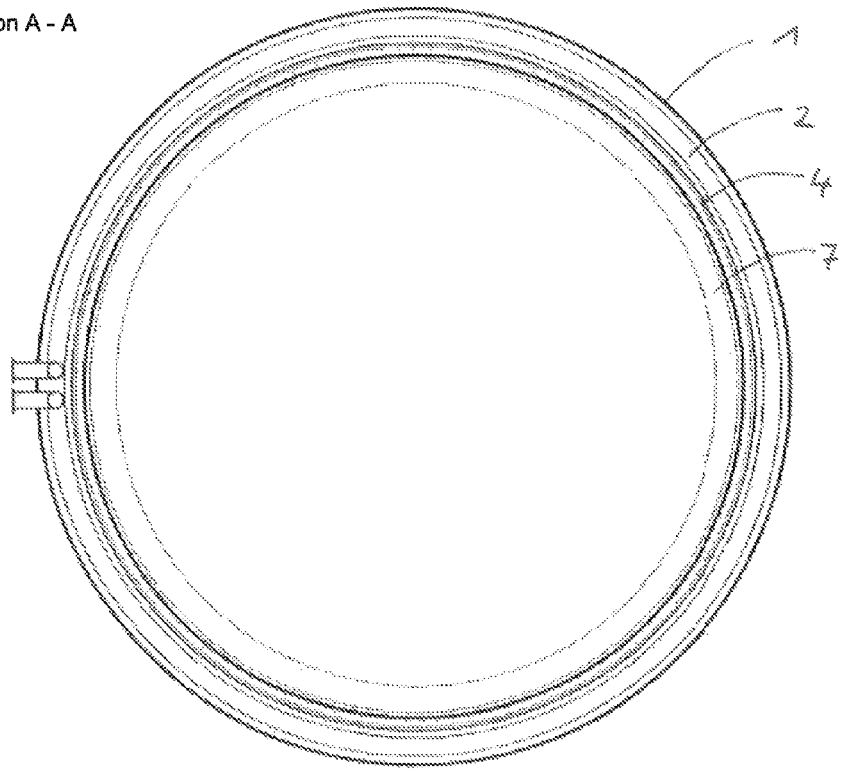
FIG. 2 represents a cross-section in the A-A direction through the reactor of FIG. 1.

On the inner side of the lateral boundary W, the thermal insulation layer S generally completely surrounds the latter, shown by way of example in FIG. 2, in which the reference signs have the meaning stated herein.

The thermal insulation layer S conventionally adjoins the inner side of the lateral boundary W virtually directly, thus virtually without a gap, in the direction of the center point of the device D. The thermal insulation layer S may assume virtually any cross-sectional geometry on the side facing the center point of the device D, for example on the contact side towards the bed of particles or moldings, for example from straight (rectangular) to oblique, for example in the form of a trapezium, inwardly curved (concave) and outwardly curved (convex), i.e. the side facing the center point of the device D, or step-like with one or more steps. This is shown by way of example in FIGS. 1, 2, 4, 5, 6, 7, 8 and 9, in which the reference signs have the meaning stated herein. The thermal insulation layer S may consist of a single piece or be assembled from individual elements to obtain the desired cross-sectional geometry, as is described below in greater detail.

The thickness of this thermal insulation layer S relative to the diameter of the bottom B is conventionally in the range from 1% to 5%, for example 1.7%. The thermal insulation layer S is for example 100 mm thick at a diameter of the bottom B of 2500 to 6000 mm.

The material for the thermal insulation layer S is selected from the group consisting of a ceramic material, for example fireclay, microporous material and silicate fibers, the above-stated materials not generally decomposing in the temperature range from approx. 700 to 1100° C. and conventionally having a thermal conductivity in the range from 0.04 to 0.09 W/m/K.

Preferred as the microporous material are microporous silicate substances containing highly disperse silica and opacifiers which do not decompose in the temperature range from approx. 700 to 1100° C. and, in the temperature range from 700 to 1100° C., have a thermal conductivity in the range from 0.04 to 0.09 W/mK, for example the products WDS® High and WDS® Ultra from Porextherm, see three-page data sheet version 1.4/15-02 10/HH WDS® High and three-page data sheet version 1.03/15-02 10/HH WDS® Ultra from Porextherm Dämmstoffe GmbH, Heisinger Street 8/10, 87437 Kempten, www.porextherm.com.

The thermal insulation layer S may be made up of sheets of the above-stated material, preferably the microporous silicate substances, with a thickness of for example 10 to 50 mm, the sheets being adapted to the required shapes or cross-sectional geometries of the thermal insulation layer W.

In a preferred embodiment, the above-stated material, preferably microporous silicate substances, the latter preferred since they have been thermally pretreated at 850° C., and/or silicate fibers in the form of mats, is enclosed in cassettes (hereinafter also denoted "insulation cassettes") for the thermal insulation layer S, as described blow, which may then, as described below, be assembled in general to form the thermal insulation layer S.

An insulation cassette with enclosed insulating material is described below by way of example. The insulation cassette conventionally consists of a metal housing, for example of high temperature-resistant steels, which is filled with one or more insulation materials, such as the above-described microporous material, preferably the microporous silicate substances, and/or silicate fibers, the latter preferably in the form of mats. The microporous material enclosed in the insulation cassettes is for example spaced from the metal wall by silicate fiber mats or intumescent mats of vermiculite and silicate fibers.

The metal housing of the insulation cassettes may consist of one or more metals, for example high-temperature materials such as Inconel 600, alloy 602 CA conventionally on the side of the insulation cassette facing towards the higher temperature and material 1.4541 on the side of the insulation cassette conventionally facing towards the lower temperature.

Figure 12:
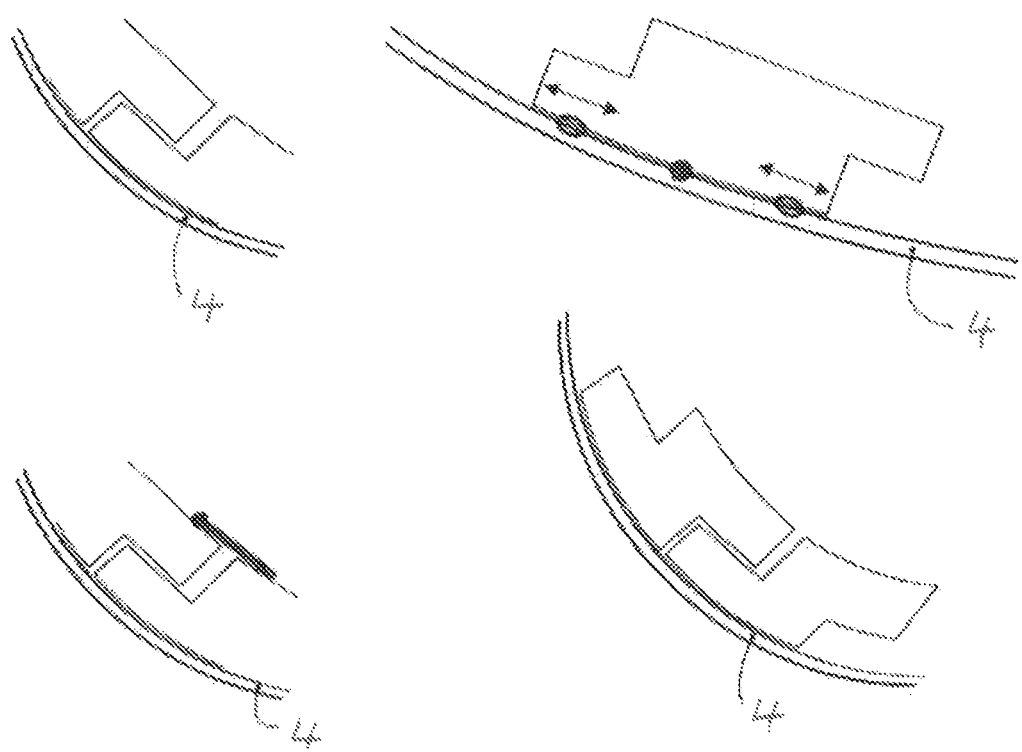
FIG. 12 represents several embodiments of insulation cassettes.

These insulation cassettes preferably have a cuboidal shape, preferably with a slight curvature and seams or other overlapping means which are capable of forming a tongue and groove configuration and are shown for example in FIG. 12, in which the reference signs have the meaning stated herein. The walls located at the end faces of the cassettes and which conventionally form the seam and overlap regions of the cassettes which have been assembled with one another, should conventionally be made from thin metal, for example in order to reduce the effective overall heat transmission.

The wall thickness of the seam and overlap region of the insulation cassettes is conventionally in the range from 0.2 to 0.5 mm and is conventionally less than the wall thickness of the remainder of the thermal insulation cassette, which is conventionally in the range from 0.8 to 1.5 mm. The seam and overlap regions of the insulation cassettes are preferably embossed with a corrugated pattern.

Figure 13:
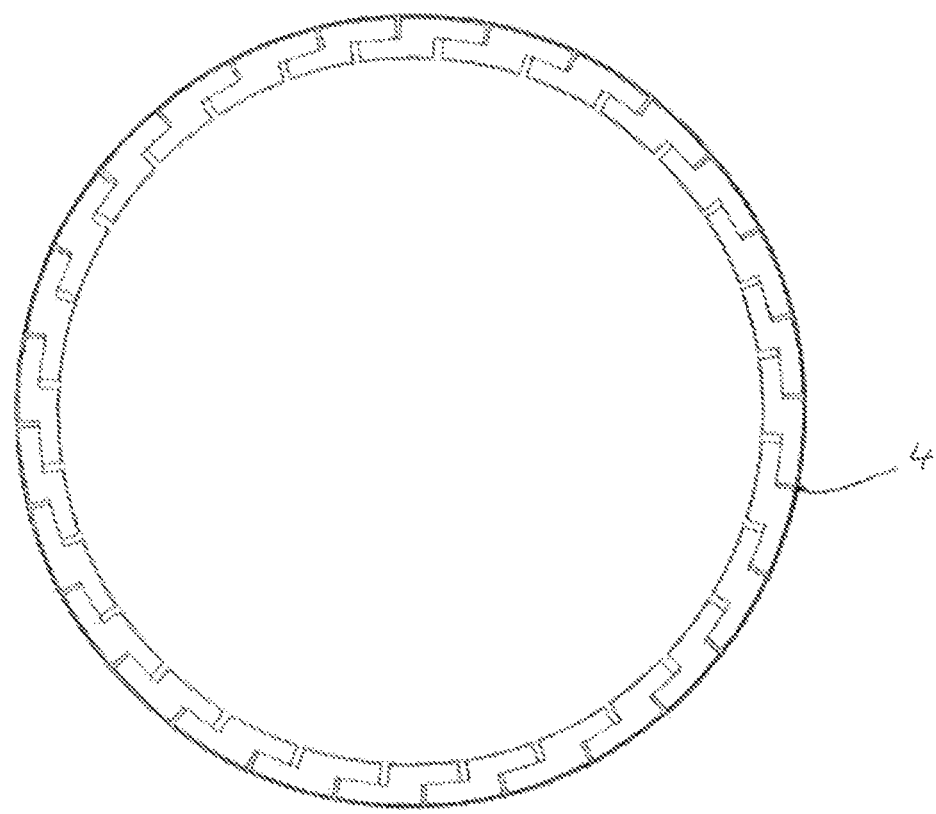
FIG. 13 represents a diagrammatic representation of a thermal insulation layer assembled from insulation cassettes shown in FIG. 12.

For example, the thermal insulation layer S is constructed by arranging the above-described insulation cassettes in segments on the inner side of the lateral boundary W around the circumference, as is shown for example in FIG. 13, in which the reference signs have the meaning stated herein.

The insulation cassettes are preferably provided in the circumferential direction (tangential direction) with a sliding seat or other methods of superposition, for example tongue and groove, and have freedom of movement for example only in the circumferential direction, as is shown for example in FIG. 12, in which the reference signs have the meaning stated herein.

Examples of a thermal insulation layer S, in particular in the NOx/HNO$_3$ embodiment, which is made up of the insulation cassettes described herein and the assembly of these insulation cassettes to form the thermal insulation layer S, are described in FIGS. 12 and 13, in which the reference signs have the meaning stated herein.

The insulation cassettes are conventionally assembled with one another at the installation temperature, which is conventionally 0 to 30° C., in such a manner that at the location in the reactor where the insulation cassette is exposed to a higher temperature, the joint width is larger than at the lower temperature location in the reactor R, which conventionally means that, on exposure to an elevated operating temperature in the reactor R, the insulation cassettes expand and adjoin one another as closely as possible virtually without tension or distortion.

Figure 9:
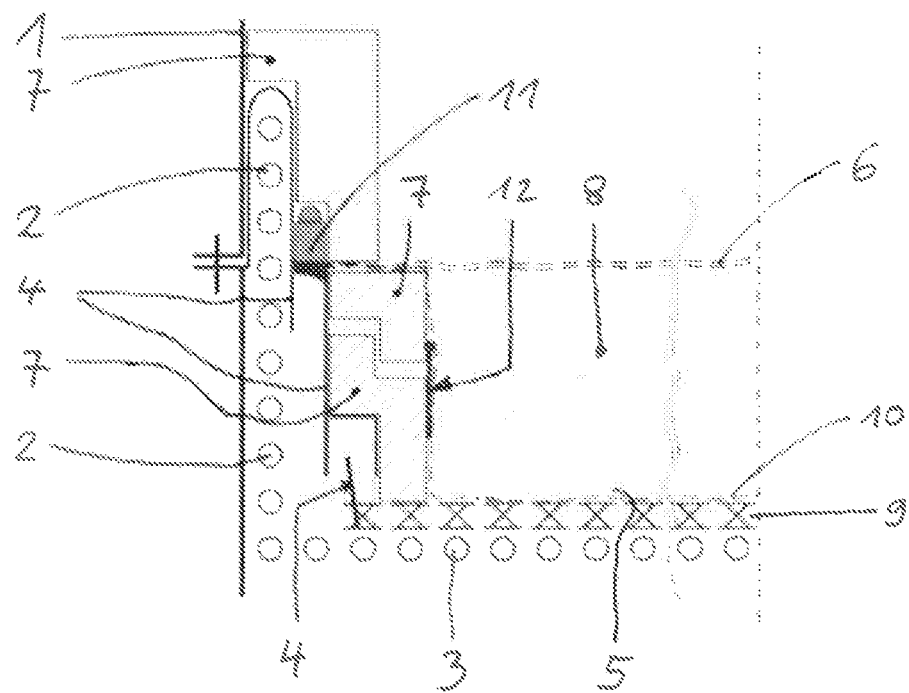
FIG. 9 represents another one half (vertical section) of a cylindrical reactor FIG. 1.

In one embodiment, part of the lateral boundary W, with or preferably without a thermal insulation layer S, here denoted W1, may be firmly connected to the bottom B, completely surround the latter and be relatively low, for example W1 has a height in the range from 50 to 150 mm. The second part of the lateral boundary W, here denoted W2, may be arranged as an "apron", for example in the form of a Z-shaped structure, and preferably fixed to the internal wall of the reactor completely surrounding said internal wall, the end of the apron W2 for example taking the form of a downward facing inverted U or V profile. The lateral boundary W1 projects into the opening of said inverted U or V. The lateral boundary W1 is firmly connected to the bottom B for example by welding. The thermal insulation layer S, conventionally beneath an optionally present catalyst gauze, is preferably constructed in two parts and preferably in a sliding seat configuration, the upper of the two parts of the thermal insulation layer S conventionally preferably being firmly connected to the upper lateral boundary W2 and the lower part of the thermal insulation layer S not being firmly connected to the upper lateral boundary W2, such that it can still move upwards and downwards in a vertical direction. A thermal insulation layer S may also be attached above an optionally present catalyst gauze, preferably covering all the rest of the lateral boundary W. In one variant of this embodiment, W1 may be connected to the bottom B not firmly, but instead reversibly such that it can be detached from and reconnected to the latter with little effort, for example by welding, insertion or screwing. FIG. 9 shows this above-described embodiment by way of example, in which the reference signs have the meaning stated herein.

Figure 8:
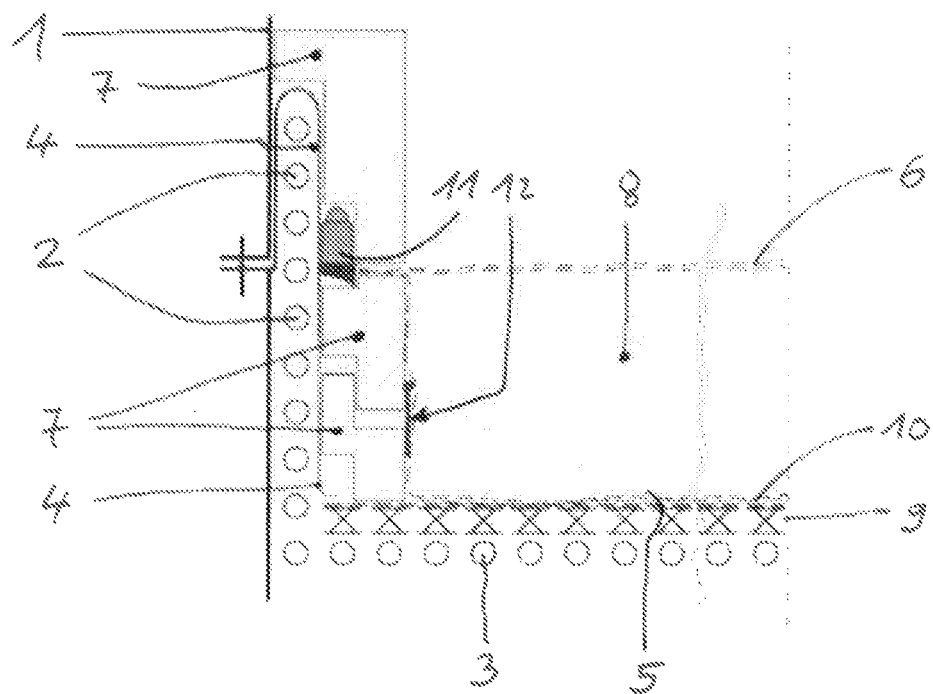
FIG. 8 represents another one half (vertical section) of a cylindrical reactor FIG. 1.

In a further embodiment, the lateral boundary W completely surrounds the bottom B and is not firmly connected thereto, but instead arranged and preferably fixed for example as an "apron" on the internal wall of the reactor completely surrounding said internal wall, there being between the lower end of the apron and the bottom B a peripheral gap which is conventionally as tall as the anticipated upward longitudinal expansion of the bottom B due to an increase in temperature. The thermal insulation layer S, conventionally beneath an optionally present catalyst gauze, is preferably constructed in two parts and preferably in a sliding seat configuration, the upper of the two parts of the thermal insulation layer S conventionally being connected, preferably firmly, to the lateral boundary W and the lower part of the thermal insulation layer S not being firmly connected to the lateral boundary W, such that the lower part of the thermal insulation layer S can still move upwards and downwards in a vertical direction. A thermal insulation layer S may also be attached above an optionally present catalyst gauze, preferably covering all the rest of the lateral boundary W. FIG. 8 shows this above-described embodiment by way of example, in which the reference signs have the meaning stated herein.

At least in the region of the internal wall of the reactor R where the device D is accommodated, cooling devices, for example tubes through which a heat absorption medium, for example water or fused salt, flows, are conventionally arranged between the internal wall of the reactor R and the outer side of the lateral boundary W of the device D, for example by the tubes in the form of a tube coil being arranged between the internal wall of the reactor and the outer side of the lateral boundary W, as for example shown in FIGS. 1, 2, 4, 5, 6, 7, 8 and 9, in which the reference signs have the meaning indicated herein. Such cooling devices conventionally have the task of protecting the reactor wall from excessive heat by providing active cooling, at least in the region of the device D and/or the reactor flanges.

Figure 10:
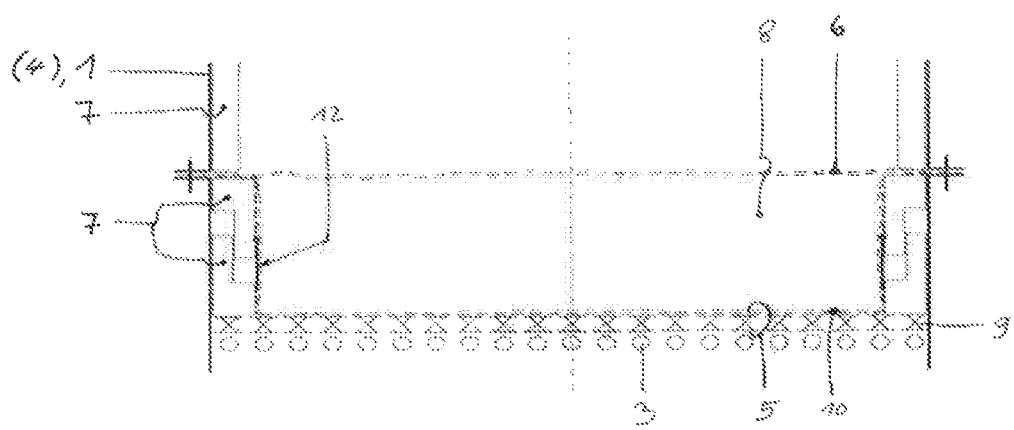
FIG. 10 represents another longitudinal section through part of a cylindrical reactor.
Figure 11:
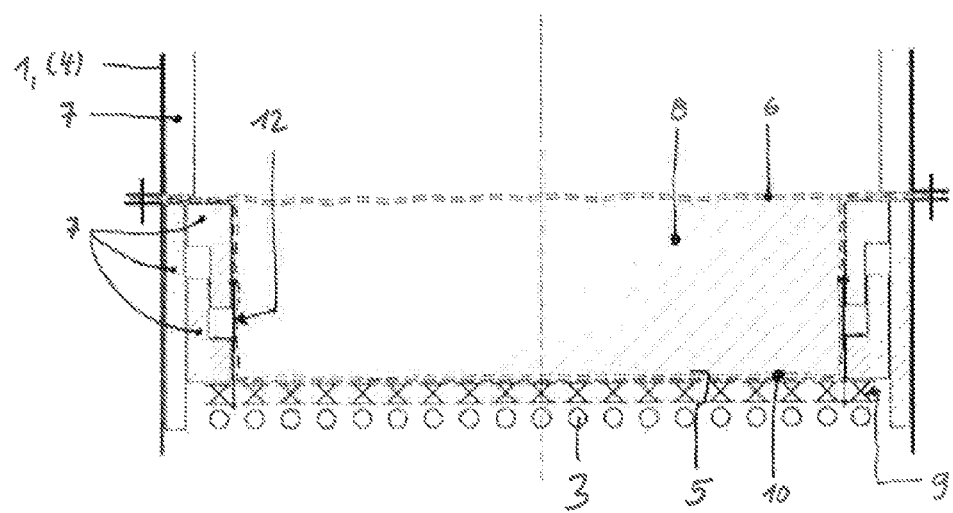
FIG. 11 represents another longitudinal section through part of a cylindrical reactor.

In one embodiment, the cooling devices on the internal wall of the reactor R may be entirely or partially replaced in the region of the device D by a thermal insulation layer S, as described herein, as for example shown in FIGS. 10 and 11, in which the reference signs have the meaning indicated herein.

In this case, the region of the internal wall of the reactor R where the device D is accommodated itself forms the lateral boundary W, on the inner side of which is located the thermal insulation layer S, preferably composed of the above-described insulation cassettes, which extends peripherally at least in part, preferably completely and virtually without gaps and for example up to a height in the range from 200 to 1200 mm, measured upstream from the bottom B. FIGS. 10 and 11 show this embodiment by way of example, in which the reference signs have the meaning stated herein.

On the side facing the bottom B in the upstream direction there may be located at least one noble metal fabric, for example of platinum, palladium, rhodium and/or noble metal alloys, for example containing the above-stated noble metals, and/or at least one non-noble metal fabric, for example Megapyr screen (Kanthal screen), the latter conventionally for mechanically stabilizing the noble metal gauze, as for example shown in FIGS. 1, 4, 5, 6, 7, 8, 9, 10, 11, 14, 15 and 16, in which the reference signs have the meaning stated herein, in particular for the $NOx/HNO_3$ embodiment. The above-described noble metal and/or non-noble metal fabric is also here denoted "catalyst gauze".

In this case, the volume V is preferably filled with catalytic and/or non-catalytic moldings at most up to the undermost noble metal and/or non-noble metal fabric, preferably such that said moldings abut the undermost gauze and so for example provide support virtually over the entire area of the noble metal and/or non-noble metal fabric.

The shape and size of the catalytic and/or non-catalytic moldings is variable. Relatively small regularly or irregularly shaped particles generally with a length in the range from 3 to 30 mm, a diameter in the range from 2 to 10 mm, for example with a cylindrical or stellate cross-section and/or larger moldings, for example in the form of quadrangular or hexagonal honeycombs, for example with a diameter of 3 to 20 cm and a height of 5 to 100 cm, or combinations of a lower layer of relatively small particles and an upper layer of larger moldings are for example suitable.

The latter variant is preferred if the packing of catalytic and/or non-catalytic moldings does not extend right up to the noble metal and/or non-noble metal fabric. Said variant provides a structure for supporting the stated fabric on which the fabric can rest. The two layers of moldings are preferably separated from one another by a screen. Accordingly, metallic hollow cylinders or hexagonal honeycomb moldings or porous inert moldings or beds of moldings may for example be arranged, separated by a screen, on a bed of relatively small catalytic and/or non-catalytic moldings.

In further variants, the stated catalytic and/or non-catalytic moldings may be arranged in the volume V, for example as follows, preferably at most up to the undermost noble metal and/or non-noble metal fabric:

(A) a layer of catalytic moldings, conventionally relatively small regularly or irregularly shaped particles generally in the size range as described above, (B) a layer of non-catalytic moldings, conventionally relatively small regularly or irregularly shaped particles generally in the size range as described above.

Figure 14:
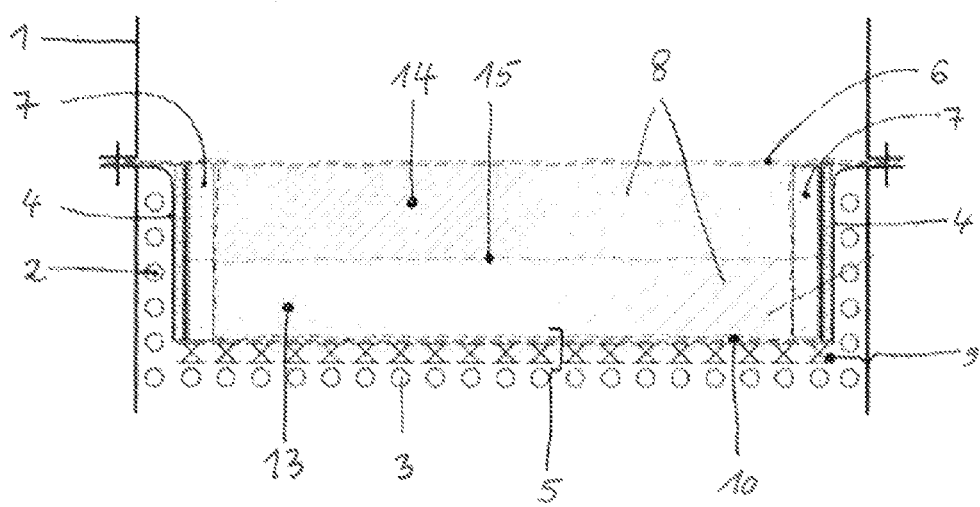
FIG. 14 represents another longitudinal section through part of a cylindrical reactor with a lower layer of catalytic moldings and an upper layer of non-catalytic moldings.

(C) a plurality of layers of catalytic and/or non-catalytic moldings, conventionally relatively small regularly or irregularly shaped particles generally in the size range as described above, arranged alternately or irregularly, as shown for example in FIG. 14. The layers are here conventionally horizontally separated by devices, such as horizontally arranged perforated metal sheets or metal screens, for example Megapyr screens.

Figure 15:
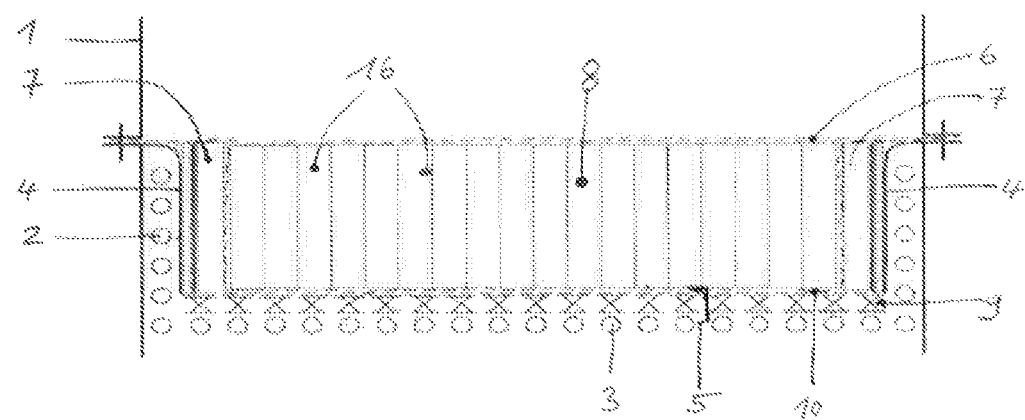
FIG. 15 represents another longitudinal section through part of a cylindrical reactor with a layer of larger catalytic moldings.

(D) either a layer of catalytic moldings or a layer of non-catalytic moldings or a layer of a combination of catalytic and non-catalytic moldings, in each case larger moldings, for example hexagonal honeycombs, which cover the bottom B virtually without gaps and largely over the entire area, as shown for example in FIG. 15.

Figure 16:
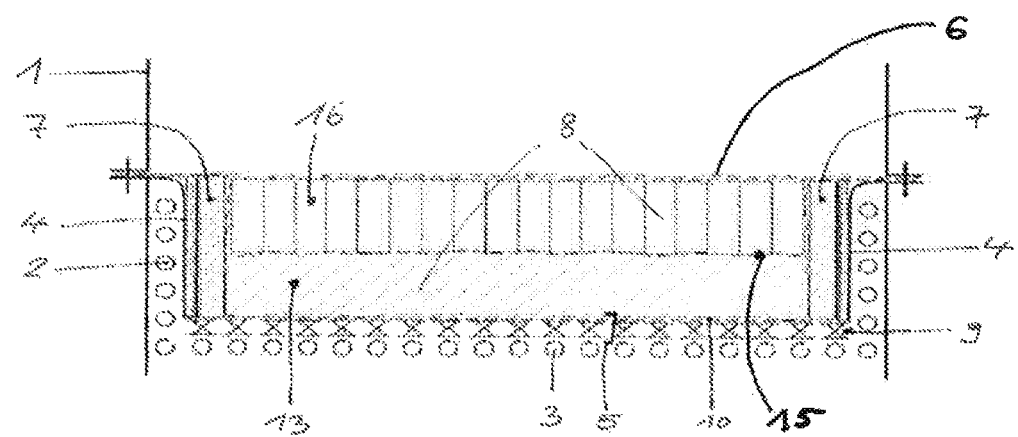
FIG. 16 represents another longitudinal section through part of a cylindrical reactor with a lower layer of catalytic moldings and an upper layer of non-catalytic moldings.

(E) configuration (D) arranged on a bed of configuration (A) or (B) or (C), as shown for example in FIG. 16.

The arrangement for the stated catalytic and/or non-catalytic moldings in the volume V is shown by way of example in FIGS. 14 to 16.

Further moldings with the above-stated dimensions may be the following: high flow rings, rings, spheres, extrudates, hollow extrudates or further moldings.

Non-catalytic moldings are conventionally ceramic moldings which are resistant to the reaction conditions in the reactor R and have virtually no catalytic action on the reactions in the reactor R.

Catalytic moldings are generally moldings which catalyze one or more reactions which proceed in the reactor R, for example the decomposition of dinitrogen monoxide to nitrogen and oxygen.

The present application also provides a reactor R containing the device D, it being expressly indicated that any disclosure made herein regarding the device D or other subjects of the invention is expressly incorporated into the above-stated subject matter of the present application.

The reactor R may be a vessel for carrying out chemical reactions, preferably on a large industrial scale.

Examples of such chemical reactions are oxidations of carbon-containing and/or nitrogen-containing compounds, preferably with oxygen-containing or halogen-containing gases. Examples of such oxidations are the conventional combustion of petroleum, naphtha, natural gas, coal and the like, for example for generating heat and/or electrical energy; the catalytic oxidation of ammonia with an oxygen-containing gas, preferably air or pure oxygen to yield nitrogen oxides; the "ammoxidation" of organic compounds with methyl groups or of methane with ammonia and oxygen to yield nitriles or hydrogen cyanide.

A further example of such chemical reactions is the, preferably catalytic, conversion of nitrogen oxides, preferably dinitrogen oxide ($N_2O$), to yield nitrogen and oxygen.

The reactor R is preferably a vessel for producing chemical products, preferably on a large industrial scale, for example for producing nitrogen oxides such as $NO_2$, $N_2O$, $N_2O_4$, NO and/or nitric acid and/or nitrous acid inter alia by catalytic oxidation of ammonia with an oxygen-containing gas, for example air; for producing sulfur oxides such as $SO_2$, $SO_3$ and/or sulfuric acid, sulfurous acid or further acids of sulfur oxides.

For example, the reactor R is a cylindrical vessel for producing, preferably on a large industrial scale, nitrogen oxides such as $NO_2$, $N_2O$, $N_2O_4$, NO and/or nitric acid and/or nitrous acid by catalytic oxidation of ammonia with an oxygen-containing gas, for example air or pure oxygen. A device D which is well suited for this example is for example shown in FIGS. 1 to 16, which are described in detail herein. Packings which are well suited to this device D are described in detail herein and shown for example in FIGS. 14 to 16.

The present application also provides the use of the device D in a method for producing nitrogen oxides by catalytic oxidation of ammonia, for example in the temperature range from 800 to 900° C. and on a gauze of noble metal, such as platinum or platinum-rhodium alloy, with an oxygen-containing gas, for example air or pure oxygen and optional reaction of the nitrogen oxides with water to yield nitric acid, it being expressly indicated that any disclosure made regarding the device D or other subjects of the invention made herein is expressly incorporated into the above-stated subject matter of the present invention.

The present application also provides the use of the reactor R in a method for producing nitrogen oxides by catalytic oxidation of ammonia, for example in the temperature range from 800 to 900° C. and on a gauze of noble metal, such as platinum or platinum-rhodium alloy, with an oxygen-containing gas, for example air or pure oxygen and optional reaction of the nitrogen oxides with water to yield nitric acid, it being expressly indicated that any disclosure made herein regarding the device D and/or the reactor R or other subjects of the invention is expressly incorporated into the above-stated subject matter of the present invention.

The present application also provides a method for producing nitrogen oxides, ammonia being catalytically oxidized with an oxygen-containing gas, preferably air or pure oxygen, for example in the temperature range from 800 to 900° C., for example on a gauze of noble metal, such as platinum or platinum-rhodium alloy and the resultant reaction products, which generally contain nitrogen monoxide as major component and dinitrogen oxide as minor component, being passed through a bed with catalytic and/or non-catalytic moldings, which bed is conventionally arranged downstream in the direction of flow, conventionally beneath, the catalyst gauze, wherein the bed is located in a device D or a reactor R, in each case as previously described, it being expressly indicated that any disclosure made herein regarding the device D and/or the reactor R or other subjects of the invention is expressly incorporated into the above-stated subject matter of the present invention.

The present application also provides a method for producing nitric acid, ammonia being catalytically reacted with an oxygen-containing gas, preferably air or pure oxygen, for example in the temperature range from 800 to 900° C., for example on a gauze of noble metal, such as platinum or platinum-rhodium alloy and the resultant reaction products, which generally contain nitrogen monoxide as major component and dinitrogen oxide as minor component, being passed, conventionally cooled, through a bed with catalytic and/or non-catalytic moldings, which bed is conventionally arranged downstream in the direction of flow, conventionally beneath, the catalyst gauze, said reaction products reacting with oxygen to form nitrogen dioxide and being reacted with water to yield nitric acid, wherein the bed is located in a device D or a reactor R, in each case as previously described, it being expressly indicated that any disclosure made herein regarding the device D and/or the reactor R or other subjects of the invention is expressly incorporated into the above-stated subject matter of the present invention.

Exemplary embodiments are also shown in the figures and explained in more detail in the following description.

LIST OF REFERENCE SIGNS RELATED TO THE FIGURES 1 reactor wall of the reactor R
2 lateral cooling tubes
3 heat exchanger tubes
4 lateral boundary W
5 bottom B
6 catalyst gauze
7 thermal insulation layer S (for example of insulation cassettes)
8 volume V (preferably with packing)
9 supporting part
10 bottom screen
11 fastening device with holding weight for catalyst gauze
12 cover plate
13 catalytic moldings
14 non-catalytic moldings
15 separating device for packings in volume V
16 larger catalytic moldings (preferably honeycombs)

FIG. 1 is a longitudinal section through part of a cylindrical reactor R, preferably for the $NO_x/HNO_3$ embodiment, in which the device D is accommodated. The following are shown: the reactor wall 1 with lateral cooling tubes 2 up to the level of the catalyst gauze 6, the device D comprising lateral boundary W 4, which is arranged as an apron in front of the lateral cooling tubes 2 and extends down to the bottom B 5, bottom B 5, preferably resting on the heat exchanger tubes 3 and formed of a grate as supporting part 9 and a bottom screen 10 or plurality of bottom screens 10, the screen or screens for example drawn up such that they also partially or completely cover the thermal insulation layer S 7, thermal insulation layer S 7, preferably of insulation cassettes having a virtually rectangular cross-section, volume V 8. A catalyst gauze 6 is tensioned over the device D by being laterally fixed to the reactor wall (flange). The interspace between lateral boundary W 4 and thermal insulation layer S 7 may, as shown here, be filled with an insulating material, for example intumescent mats of vermiculite and silicate fibers. The volume V 8 conventionally accommodates catalytic and/or non-catalytic solid particles, for example with a cylindrical or stellate cross-section, and/or larger catalytic and/or non-catalytic moldings, for example in the form of hexagonal honeycombs. A gaseous medium conventionally flows through the device D from above (catalyst gauze 6) towards and through the bottom B 5.

FIG. 2 shows a cross-section in the A-A direction through the reactor of FIG. 1.

FIG. 3 shows a supporting part 9 in the form of a grate which can be assembled in the reactor from four pieces of the geometry shown, it then being possible to connect the four pieces together via fixing points, here shown for example as lengthwise or crosswise dashes between the pieces.

Figure 4:
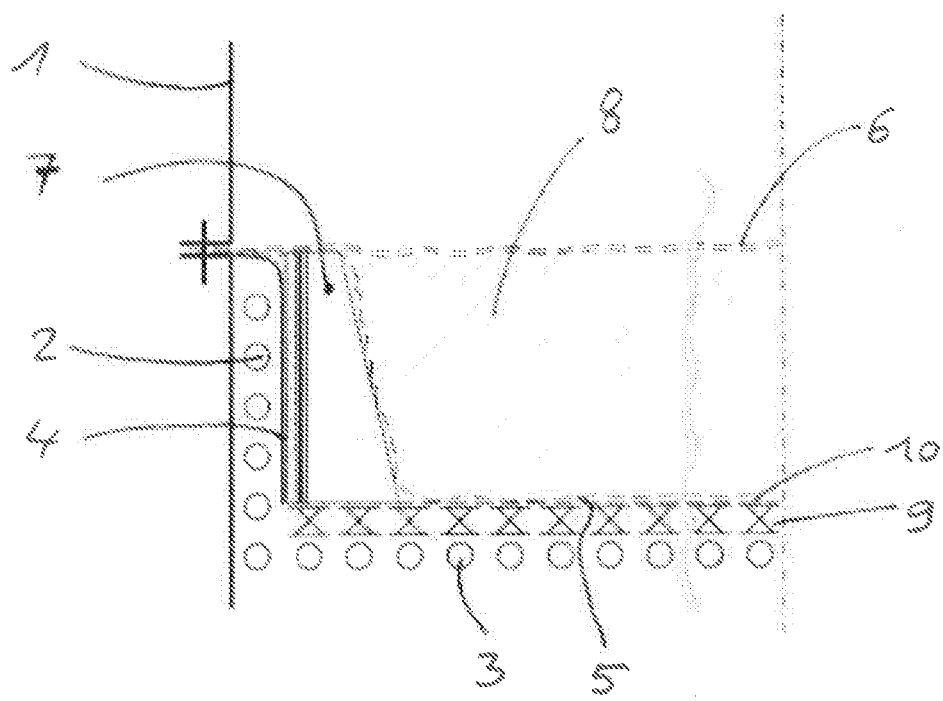
FIG. 4 represents a one half (vertical section) of a cylindrical reactor FIG. 1.

FIG. 4 shows one half (vertical section) of FIG. 1, with the difference that the thermal insulation layer S 7 has an oblique cross-section, here as a trapezium with the longer base side (i.e. the longer of the two parallel sides of the trapezium) next to the bottom B.

Figure 5:
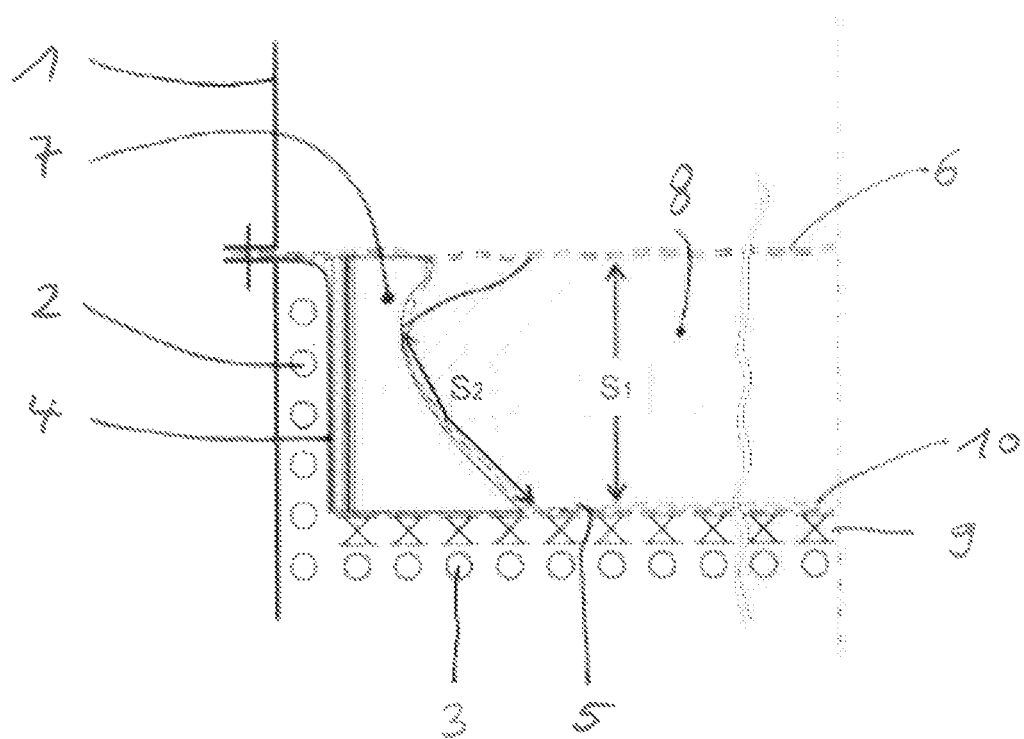
FIG. 5 represents another one half (vertical section) of a cylindrical reactor FIG. 1.

FIG. 5 shows one half (vertical section) of FIG. 1, with the difference that the thermal insulation layer S 7 has a virtually concave cross-section, the section from the bottom B 5 in the concave upwards curvature, here denoted S2, being at least as long as the height, here denoted S1, from the bottom B 5 to the catalyst gauze 6. This conventionally results in a gaseous medium which is flowing from above (catalyst gauze 6) through a packing accommodated in the device D towards and through the bottom B 5 having, despite the presence of indentations at the periphery of the device D, the same residence time at the periphery of the device D as in the regions of the device D, for example the middle, with intact packing.

Figure 6:
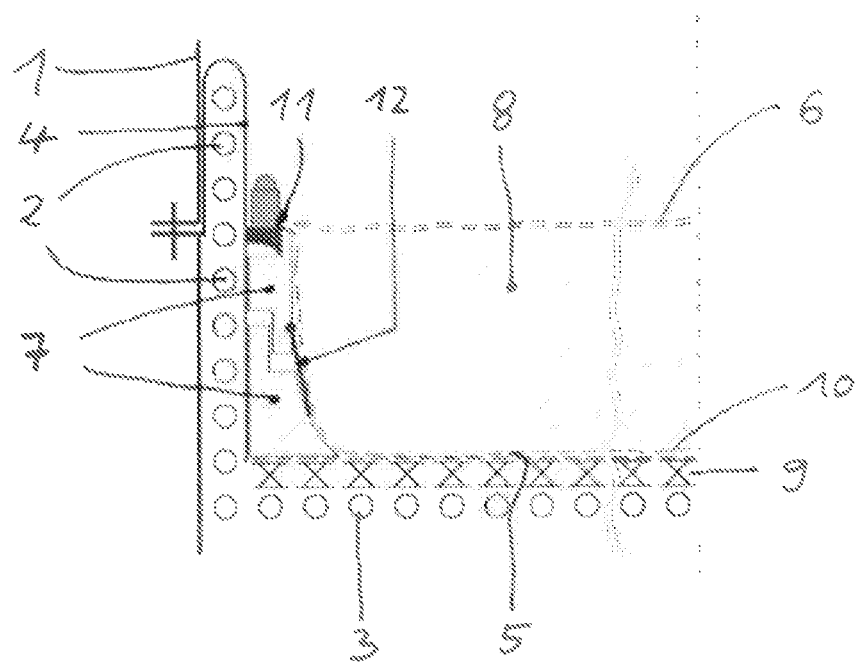
FIG. 6 represents another one half (vertical section) of a cylindrical reactor FIG. 1.

FIG. 6 shows one half (vertical section) of an arrangement similar to FIG. 1 with the difference that the lateral cooling tubes 2 are arranged on the reactor wall 1 vertically above the level of the catalyst gauze 6 and upstream beyond the flange, the lateral boundary W 4 is fixed to the reactor wall 1, preferably at the level of the flange, and is arranged with a U-shaped bend in front of the lateral cooling tubes 2 as an apron which extends to the bottom B 5. A fastening device 11 of a metallic supporting ring extending in the circumferential direction with a holding weight for the catalyst gauze 6 lying on the supporting ring is attached to the lateral boundary W 4. A further difference relative to FIG. 1 is that the thermal insulation layer S 7, preferably of insulation cassettes, is constructed in two parts which, when viewed as a unit, have a virtually concave cross-section. The upper part of the thermal insulation layer S 7 is fastened to the lateral boundary W 4 beneath the catalyst gauze 6. The lower part of the thermal insulation layer S 7 is preferably fastened, preferably reversibly, only to the bottom B 5, and is in contact with the lateral boundary W 4. It fits with a sliding seat into the upper part of the thermal insulation layer S 7 while maintaining an expansion joint which can be closed with a cover plate 12.

Figure 7:
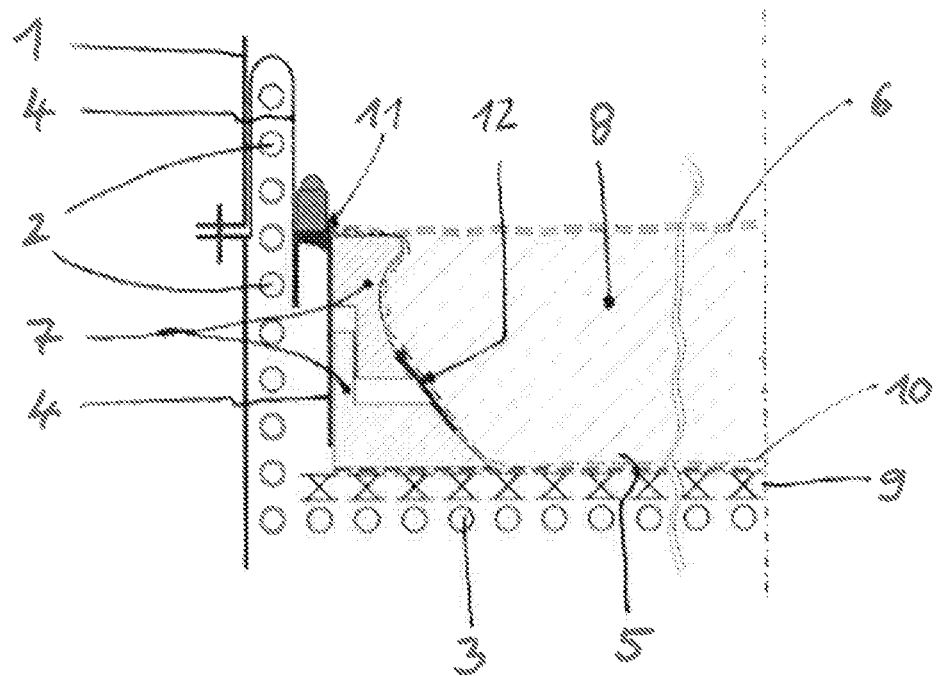
FIG. 7 represents another one half (vertical section) of a cylindrical reactor FIG. 1.

FIG. 7 shows the arrangement of FIG. 6 with the difference that the lateral boundary W 4 is formed from a first U-shaped apron, which does not extend down to the bottom B 5 but, for example, only to somewhat below the flange, and a second apron which extends virtually down to the bottom B 5 or stops just above the bottom B 5, which second apron is attached to a metallic supporting ring which extends in a circumferential direction and is attached to the first apron, which supporting ring, again extending in a circumferential direction, is attached to the first apron and, with a holding weight, forms the fastening device 11 for the catalyst gauze 6.

FIG. 8 shows the arrangement of FIG. 6 with the differences that the thermal insulation layer S 7, preferably of insulation cassettes, has a rectangular, for example step-like, cross-section and is additionally attached above the catalyst gauze 6 to the lateral boundary W 4, preferably enclosing the latter and the fastening device with holding weight 11.

FIG. 9 shows the arrangement of FIG. 8 with the differences that the lateral boundary W 4 is in two parts, namely as a Z-shaped structure with an end piece in the form of an inverted U which does not extend down to the bottom B 5, but is instead drawn over the second part of the lateral boundary W4 which is attached as a wall to the periphery of the bottom B 5.

FIG. 10 is a longitudinal section through part of a cylindrical reactor R, preferably for the $NO_x/HNO_3$ embodiment, in which the device D is accommodated. The following are shown: the reactor wall 1, the device D comprising lateral boundary W 4, which is here formed by the reactor wall 1, bottom B 5, preferably resting on the heat exchanger tubes 3 and formed of a grate as supporting part 9 and a bottom screen 10 or plurality bottom screens 10, the screen or screens for example drawn up such that they also partially or completely cover the thermal insulation layer S 7. A catalyst gauze 6 is tensioned over the device D by being laterally fixed to the reactor wall (flange). The thermal insulation layer S 7, preferably of insulation cassettes, is constructed in two parts beneath the catalyst gauze 6 and has a rectangular, step-like cross-section. The upper part of the thermal insulation layer S 7 is fastened to the reactor wall 1 beneath the catalyst gauze 6. The lower part of the thermal insulation layer S 7 is preferably fastened, preferably reversibly, only to the bottom B 5, and is in contact with the reactor wall 1. It fits with a sliding seat into the upper part of the thermal insulation layer S 7 while maintaining an expansion joint which can be closed with a cover plate 12. The thermal insulation layer S 7, preferably of insulation cassettes, is attached to the reactor wall 1 above the catalyst gauze 6 up to a height in the range of for example 250 to 2000 mm and has a rectangular cross-section. The volume V 8 conventionally accommodates catalytic and/or non-catalytic solid particles, for example with a cylindrical or stellate cross-section, and/or larger catalytic and/or non-catalytic moldings, for example in the form of hexagonal honeycombs. A gaseous medium conventionally flows through the device D from above (catalyst gauze 6) towards and through the bottom B 5.

FIG. 11 shows the arrangement of FIG. 10 with the difference that the two-part thermal insulation layer S 7, preferably of insulation cassettes, located beneath the catalyst gauze 6 and constructed with a sliding seat, is attached to a further thermal insulation layer S 7 which is attached to the reactor wall 1 beneath the catalyst gauze 6 down to the level of the heat exchanger tubes 3, has a rectangular cross-section and is preferably made up of insulation cassettes.

FIG. 12 shows examples of insulation cassettes, conventionally of metal and filled with a microporous material resistant to relatively high temperatures, having two longitudinal sides, one facing the higher temperature region, the other facing the lower temperature region, the latter conventionally the lateral boundary W 4, and seam and overlap regions at the end faces of the insulation cassettes by means of which the latter are assembled to form the peripheral thermal insulation layer S, for example as shown.

FIG. 13 is a diagrammatic representation of a thermal insulation layer S 7 which lies against a lateral boundary W 4 and is made up of insulation cassettes, as shown for example in FIG. 12, which have been assembled with one another.

FIGS. 14 to 16 show the arrangement of FIG. 1 with the difference that the volume V 8 accommodates different particles and/or moldings in different configurations as follows:

In FIG. 14, a lower layer of catalytic moldings 13 and an upper layer of non-catalytic moldings 14, in each case in particulate form and in each case as described in the description are located in the volume V 8. The layers are here conventionally horizontally separated by separating devices 15, such as horizontally arranged perforated metal sheets or metal screens, for example Megapyr screens.

In FIG. 15, a layer of larger catalytic moldings 16, as described in the description, for example hexagonal honeycombs with a diameter of approx. 6 cm and a height of approx. 25 cm, but which are at least so tall that they support the catalyst gauze 6 at least in places and cover the bottom B 5 virtually without gaps and largely over the entire area is located in the volume V 8.

In FIG. 16, a lower layer of catalytic moldings 13 and an upper layer of larger catalytic moldings 16, in each case as described in the description, the larger moldings being for example hexagonal honeycombs with a diameter of approx. 6 cm and a height of approx. 25 cm, but being at least so tall that in this configuration they support the catalyst gauze 6 at least in places is located in the volume V 8. The layers are here conventionally horizontally separated by separating devices 15, such as horizontally arranged perforated metal sheets or metal screens, for example Megapyr screens.

EXAMPLES

General

An ammonia-air mixture (12.5 vol. % $NH_3$, 87.5 vol. % air) is supplied to the ammonia combustion furnace (reactor R) in which is accommodated a device D in the form of a basket. The basket-like device D has an internal diameter of 3.52 m. The reactor R is operated at an ammonia-air mixture throughput of 3650 $Nm^3/h$ and per $m^2$ of catalyst gauze area. The inlet temperature of the ammonia-air mixture into the reactor R amounts to 28.4° C. and the pressure in the reactor R before the platinum catalyst gauze is 1080 mbar (absolute). The ammonia combusts on the platinum catalyst gauze at temperatures of approx. 880° C. to yield the reaction product which is then passed through the device D, containing a catalytically active packing, and contains nitrogen monoxide as major component and small quantities of dinitrogen monoxide $N_2O$ ("nitrous oxide"). The nitrous oxide concentration of the reaction product immediately after the platinum catalyst gauze, i.e. before it has come into contact with the catalytically active packing of the basket-like device D, amounts to approx. 1000 ppm. Downstream of the platinum gauze is arranged the basket-like device D containing a 150 mm deep layer of extruded solid catalyst pellets, said extruded pellets having a stellate cross-section, a diameter of approx. 6 mm and length of 5 to 30 mm and consist of a mixture of CuO. ZnO and $Al_2O_3$.

The non-screen-like parts of the basket-like device D consist of Inconel 600, the lateral boundary W is approx. 250 mm tall.

Samples of the reaction product can be taken immediately after the platinum catalyst gauze (sampling point 1) and in the middle of the reactor R downstream immediately beneath the bottom B of the device D (sampling point 2) and at the periphery of the reactor downstream immediately beneath the outer peripheral zone of the bottom B of the device D (sampling point 3) and be investigated for nitrous oxide concentration by a GC/MS method.

For the test according to the invention, the basket-like device D and the reactor R are respectively constructed as shown and described in FIG. 1 and FIG. 2 and accommodated in the reactor as shown and described in FIG. 1 and FIG. 2. The thermal insulation layer S is located from the bottom B of the device D to the catalyst gauze and completely surrounds the bottom B. Said layer is made up of the insulation cassettes described herein and below and as shown in FIGS. 12 and 13. The insulation cassettes consist of a metal housing of Inconel 600 on the side of the insulation cassette facing the higher temperature and material 1.4541 on the side of the insulation cassette facing the lower temperature. The insulation cassettes are filled with microporous silicate substances which are spaced from the metal wall by silicate fiber mats.

For testing, an identical device, but without the thermal insulation layer S is used for comparison purpose (not according to the invention).

After operating the reactor R for nine months, the device D and the packing thereof were tested. Nitrous oxide concentrations are measured during operation of the reactor R.

Comparative Example 1 (not According to the Invention)

An ammonia-air mixture as described above is reacted in a continuous method, no thermal insulation layer S according to the invention being used in the device D.

The peripheral region of the device D has a funnel-shaped indentation in the form of a 96 mm deep trench in the catalytically active packing, the height of which in the peripheral region of the device D amounts to just 54 mm (150 mm before the start of the test).

The measured nitrous oxide concentration at sampling point 3 virtually beneath the hopper-shaped indentation amounts to 676 ppm nitrous oxide, at sampling point 2 the measured nitrous oxide concentration amounts to 186 ppm, such that the averaged measured nitrous oxide concentration downstream of the device D and the heat exchanger located downstream therebeneath amounts to 227 ppm.

Example 1 (According to the Invention)

An ammonia-air mixture as described above is reacted in a continuous method, a 100 mm thick thermal insulation layer S according to the invention, as described above, being used in the device D.

The peripheral region of the device D has only a slight funnel-shaped indentation in the form of a 45 mm deep trench in the catalytically active packing, the height of which in the peripheral region of the device D is still 105 mm (150 mm before the start of the test).

The measured nitrous oxide concentration at sampling point 3 virtually beneath the hopper-shaped indentation amounts to 411 ppm nitrous oxide, at sampling point 2 the measured nitrous oxide concentration amounts to 188 ppm, such that the averaged measured nitrous oxide concentration downstream of the device D and the heat exchanger located downstream therebeneath amounts to 204 ppm.

The invention claimed is:

1. A device that can be accommodated in a reactor, the device comprising:
   a gas- and/or liquid-permeable bottom;
   a peripheral region arranged as a lateral boundary that completely surrounds the bottom and forms a volume, the volume which is partially or completely filled with catalytic and/or non-catalytic moldings;
   a thermal insulation layer positioned on at least part an inner side surface of the lateral boundary of the device, the thermal insulation layer being a microporous, silicatic material that includes highly dispersed silica and opacifiers, and which exhibits no decomposition in a temperature range from 700 to 1100° C., and has a thermal conductivity in a range from 0.04 to 0.09 W/m/K; and
   optionally at least one noble metal and/or non-noble metal fabric located on a side facing the bottom in the upstream direction.

2. The device of claim 1, wherein the thermal insulation layer covers 30% to nearly 100% of the inner side surface of the lateral boundary.

3. The device of claim 1, wherein the thermal insulation layer covers at least the lower 30% of the inner side surface of the lateral boundary.

4. The device of claim 1, wherein the cross-section of the bottom is essentially round.

5. The device of claim 1, including the at least one noble metal and/or non-noble metal fabric.

6. The device of claim 5, wherein the noble metal and/or non-noble metal fabric is present, and is positioned atop the catalytic and/or non-catalytic moldings.

7. A reactor that includes a device,
   the device comprising:
   a gas- and/or liquid-permeable bottom;
   a peripheral region arranged as a lateral boundary that completely surrounds the bottom and forms a volume, the volume which is partially or completely filled with catalytic and/or non-catalytic moldings;
   a thermal insulation layer positioned on at least part an inner side surface of the lateral boundary of the device, the thermal insulation layer being a microporous, silicatic material that includes highly dispersed silica and opacifiers, and which exhibits no decomposition in a temperature range from 700 to 1100° C., and has a thermal conductivity in a range from 0.04 to 0.09 W/m/K; and
   optionally at least one noble metal and/or non-noble metal fabric located on a side facing the bottom in the upstream direction; and
   cooling devices arranged proximate to an internal wall of the reactor and an outer side of the lateral boundary of the device.

8. The reactor of claim 7 with an essentially round cross-section.

9. The reactor of claim 7, further comprising a thermal insulation layer proximate to the internal wall of the reactor, and which partially replaces the cooling devices.

10. A method for producing nitrogen oxides by catalytic oxidation of ammonia with an oxygen-containing gas with the reactor of claim 7.

11. The method of claim 10 further comprising reacting the nitrogen oxides with water to yield nitric acid.

12. A method for producing nitrogen oxides, ammonia being catalytically oxidized with an oxygen-containing gas and the resultant reaction products being passed through a bed with catalytic and/or non-catalytic moldings, wherein the bed is located in a device as defined in claim 1.

13. The method of claim 12, wherein oxidation is carried out in a reactor as defined in claim 7.

14. A method for producing nitric acid, ammonia being catalytically oxidized with an oxygen-containing gas and the resultant reaction products being passed through a bed with catalytic and/or non-catalytic moldings and thereafter being reacted with water to yield nitric acid, wherein the bed is located in a device as defined in claim 1.

15. The method of claim 14, wherein oxidation is carried out in a reactor as defined in claim 7.

* * * * *